(12) United States Patent
Lowe

(10) Patent No.: US 7,161,638 B2
(45) Date of Patent: Jan. 9, 2007

(54) SPRING MOUNTING CLIP

(75) Inventor: Jerry B. Lowe, San Clemente, CA (US)

(73) Assignee: Mitsubishi Digital Electronics America, Inc., Irvine, CA (US)

( * ) Notice: Subject to any disclaimer, the term of this patent is extended or adjusted under 35 U.S.C. 154(b) by 595 days.

(21) Appl. No.: 10/216,045

(22) Filed: Aug. 9, 2002

(65) Prior Publication Data

US 2004/0027499 A1 Feb. 12, 2004

(51) Int. Cl.
H04N 5/64 (2006.01)

(52) U.S. Cl. ...................... 348/789; 348/787

(58) Field of Classification Search ............. 348/744, 348/836, 839, 825, 787, 789, 794; 24/289, 24/292, 293, 297; 248/475.1, 507, 466, 488, 248/201, 205.1, 231.81, 27.3, 316.7; H04N 5/64, H04N 5/645, 9/31
See application file for complete search history.

(56) References Cited

U.S. PATENT DOCUMENTS

| | | | |
|---|---|---|---|
| 2,625,080 A * | 1/1953 | Ferlise | 24/563 |
| 3,082,665 A * | 3/1963 | Jackson | 248/468 |
| 4,135,277 A * | 1/1979 | Taniai et al. | 24/297 |
| 4,394,000 A * | 7/1983 | Kurtz | 248/466 |
| 4,440,374 A * | 4/1984 | Achille | 248/544 |
| 4,865,281 A * | 9/1989 | Wollar | 248/71 |
| 5,356,102 A * | 10/1994 | Blumenaus | 248/205.5 |
| 5,363,149 A * | 11/1994 | Furuno et al. | 348/789 |
| 5,366,186 A * | 11/1994 | Weyeneth | 248/27.3 |
| 5,526,553 A * | 6/1996 | Klein | 24/295 |

FOREIGN PATENT DOCUMENTS

| | | | |
|---|---|---|---|
| AU | 9517671 A | * | 11/1995 |
| EP | 0047808 A | * | 3/1982 |

* cited by examiner

Primary Examiner—Sherrie Hsia
(74) Attorney, Agent, or Firm—Orrick, Herrington & Sutcliffe LLP

(57) ABSTRACT

A spring mounting clip is provided that preferably includes a spring arm coupled to and extending from a mounting base. The spring arm bends aside as the mirror is pressed against the back wall of a PTV enclosure and spring back to its original unstressed position once the mirror engages a notch in the lower arm portion. The notch preferably includes a locking surface that abuts and constrains the mirror. Alternatively, a spring mounting clip is provided that includes a spring lever arm coupled to and extending between a pair of support legs, which extend up generally at right angles from mounting feet. In operation, the arm, which includes a locking member moves inwardly toward the support legs as a mirror or other object presses against the arm and moves outwardly or freely springs away from the support legs once the mirror or object passes a transition region of the lower portion of the arm and is received by the locking member.

7 Claims, 6 Drawing Sheets

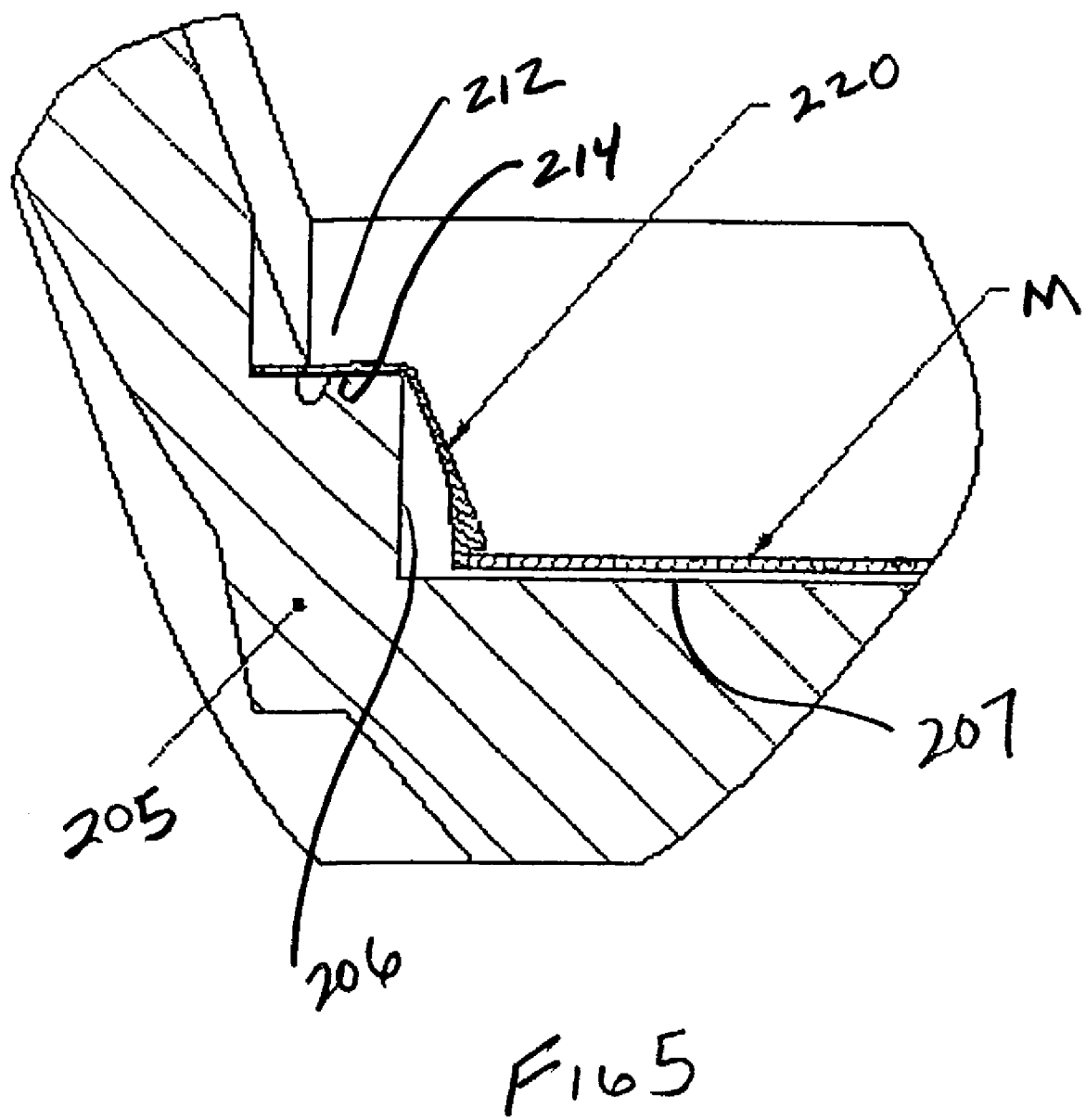

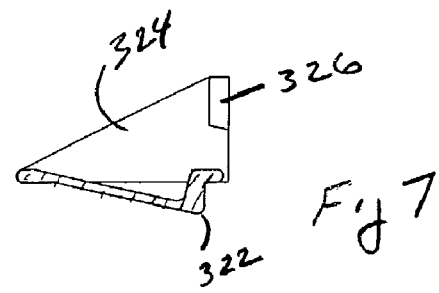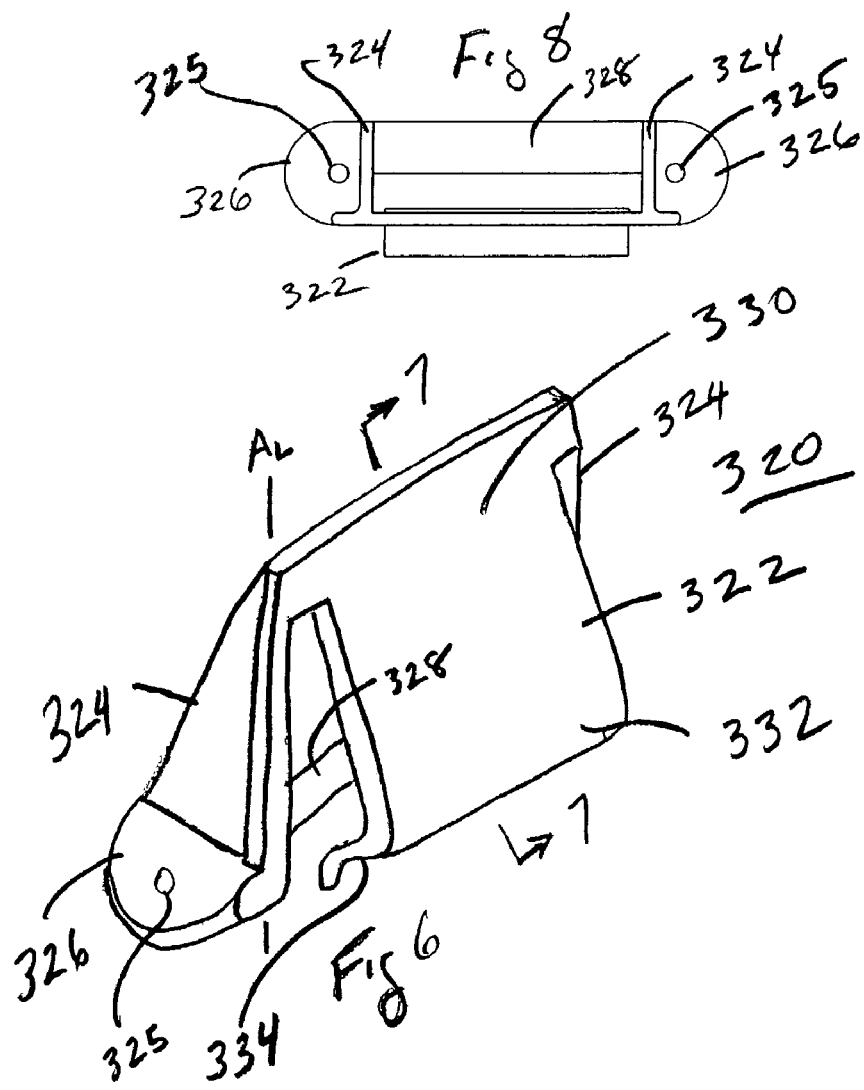

SPRING MOUNTING CLIP

FIELD OF THE INVENTION

The present invention relates generally to projection television sets, and more particularly to spring mounting clips that facilitate the mounting of a mirror within projection television set enclosures.

BACKGROUND OF THE INVENTION

Projection television sets are a popular alternative to picture tube television sets, as they provide relatively large viewable screens that cannot be efficiently produced using conventional picture tubes. Projection television sets typically include an enclosure with an optical unit, a mirror, and electronic components for receiving and projecting an image onto a screen assembly mounted on the front of the enclosure.

A typical projection television set 100 is shown in FIG. 1. The projection television set 100 has an optical unit 10 that generally includes a set of projection units 20. Each projection unit projects an image, generally of a single color of light (red, green, or blue), onto the mirror M in the enclosure 105, which focuses the image onto an inside surface of the screen S. Each projection unit 20 includes a cathode ray tube (CRT) 22, a projection lens assembly 45, and a spacer 28 interposed between each respective CRT and projection lens assembly. The projection units 20 are mounted to a bracket 50 in the enclosure 105. The enclosure 105 is typically divided by an internal wall 112 into two compartments, an upper compartment 114 and a lower compartment 116. The internal wall 112 tightly seals the upper compartment 114 from the lower compartment 116 to protect the inside of the upper compartment 114 from dust and other foreign materials. The optical unit 10 is typically mounted in the lower compartment 116, while the mirror M and screen S are mounted in the upper compartment 112. Furthermore, the optical unit 10 typically extends from the lower compartment 116 into the upper compartment through the internal wall 112.

The existing techniques for mounting the mirrors M of projection television sets have their disadvantages. In particular, present methods of mounting the mirrors on the production line is quite time consuming and require special tools and knowledge to accomplish. Therefore, it would be desirable to provide for a more efficient and reliable means for properly mounting the mirrors within the enclosures, and apparatuses for accomplishing those means.

SUMMARY OF THE INVENTION

The present invention is directed to an improved method and apparatus for mounting mirrors within the enclosures for projection television sets. In one embodiment, a spring mounting clip preferably comprises a spring arm coupled to and extending from a mounting base. Preferably, the mounting base and spring arm of the clip are of unitary construction from pliable plastic. The spring arm preferably comprises a relatively thin upper portion, which enables the arm to bend aside as a mirror of a projection television set is pressed against the back wall of the projection television set enclosure and spring back to its original unstressed position. The arm also includes a lower portion that preferably is thicker than the upper portion and includes a notch formed therein. The notch preferably includes a locking surface that abuts and constrains the mirror.

In another embodiment, a spring mounting clamp includes a spring lever arm coupled to and extending between a pair of support legs, which extend upwardly from mounting feet. The support legs are preferably connected to one another via a cross-bar extending between the support legs and located adjacent the mounting feet. The lower portion of the spring arm forms locking member. As with the first embodiment, the spring mounting clamp is preferably of unitary construction formed from pliable plastic. The arm moves inwardly toward the support legs as a mirror or other object presses against the arm and moves outwardly or freely springs away from the support legs once the mirror or object passes a transition region of the lower portion of the arm and is received by the locking member. The locking member constrains the mirror or other object.

Other objects and features of the present invention will become apparent from consideration of the following description taken in conjunction with the accompanying drawings.

DESCRIPTION OF THE DRAWINGS

FIG. 5 is a partial sectional view of a projection television set enclosure and mirror assembly including a spring mounting mirror clip in accordance with the first embodiment of the present invention shown in FIGS. 3 and 4.

FIG. 6 is an isometric view of a second embodiment of the present invention comprising a spring mounting clamp.

FIG. 7 is a cross-sectional view of the spring mounting clamp shown in FIG. 6 and taken along line 7—7 of FIG. 6.

FIG. 8 is a top view of the spring mounting clamp shown in FIGS. 6 and 7.

DETAILED DESCRIPTION

Figure 1:
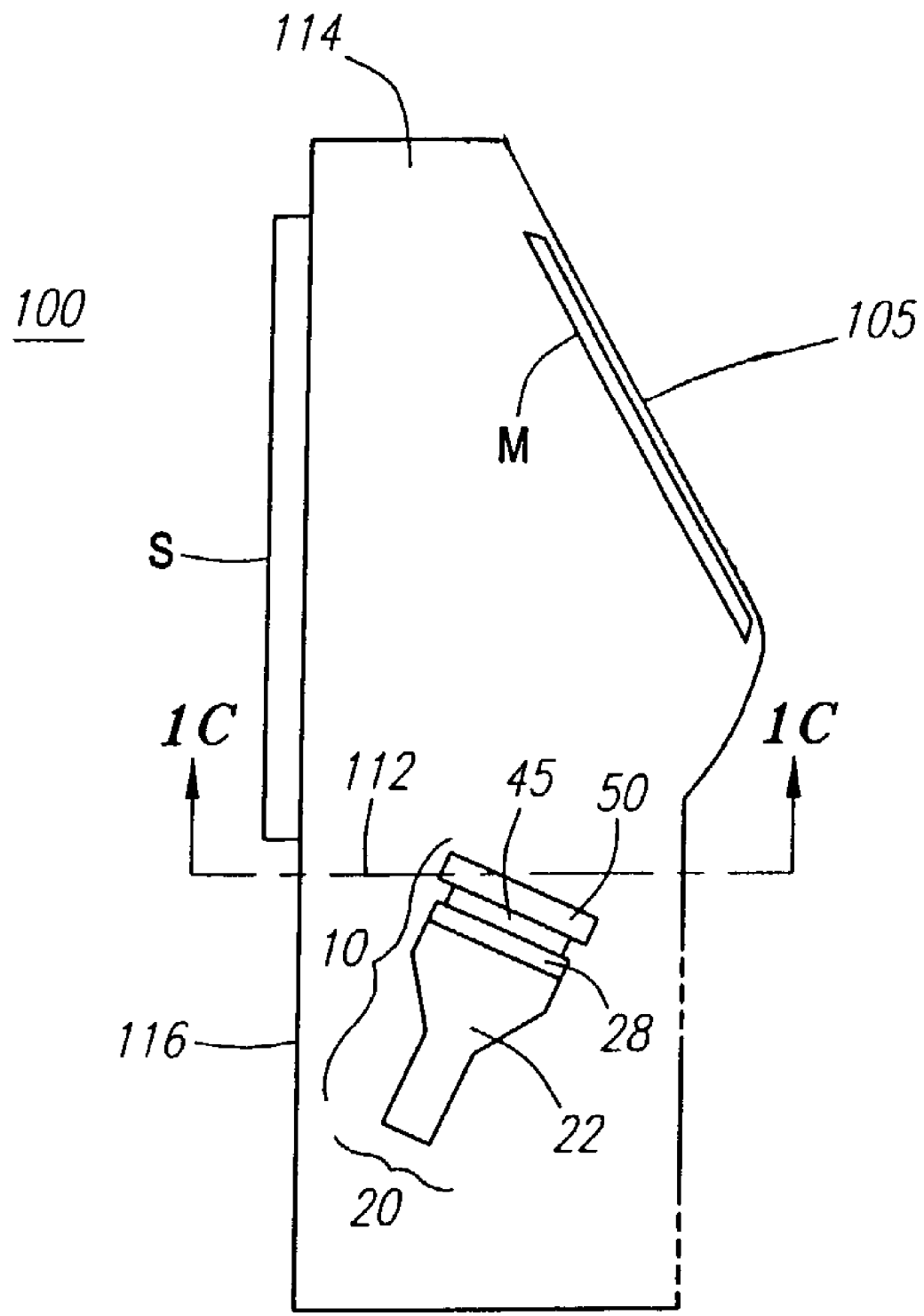
FIG. 1 is a side view of a typical projection television set showing an enclosure of the set with the components therein.
Figure 2:
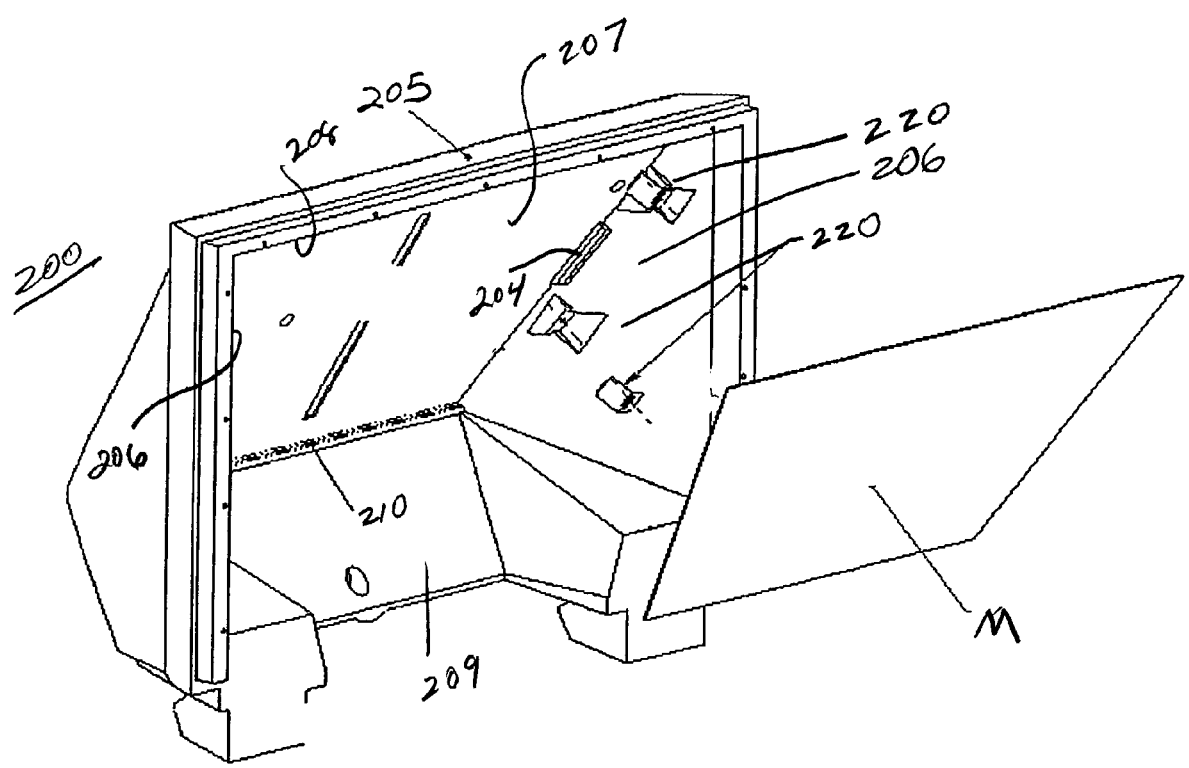
FIG. 2 is an exploded isometric view of a projection television set enclosure and mirror assembly comprising spring mounting mirror clips of the present invention.

Turning to FIG. 2, an enclosure 205 of a projection television set 200 of the present invention is illustrated. The enclosure 205 includes an upper back wall 207, right and left side walls 206 with side stops 204, a top wall 208, a bottom back wall 209, and a shelf 210 formed at the top of the bottom back wall 209. The shelf 210, right and left side stops 204 and top wall 208 preferably form a cavity or nest that surrounds a mirror M once it is installed in the enclosure 205 so as to constrain the mirror M and prevent left and right and up and down movement of the mirror M. When installed, the mirror M may be constrained against the upper back wall 207 by single axis constraints such as the spring mounting mirror clips 220 of the present invention. The use of the spring mounting clips 220 of the present invention to hold the mirror M from moving out of the nest formed by the side stops 204, shelf 210, top wall 208 and back wall 207 enables easy installation and removal of the mirror M without the need for special tools. More particularly, the mirror M is preferably placed on the shelf or locating surface 210 at its intersection with the upper back wall 207 and then pressed to the upper back wall 207 and locked in place by the spring mounting clips 220. As the mirror M is pressed to the upper back wall 207, the spring arm 222 (see, e.g., FIGS. 3–5) is pushed aside by the moving mirror M until it engages a notch 230 preferably formed in a lower portion 228 of the spring arm 222. Once the mirror M is received in the notch 230 of the spring arm 222, the spring arm 222 is free to return to its original or unstressed position and present a barrier that prevents the mirror from moving forward. As a result, the mirror M is advantageously constrained in all directions until its removal is facilitated by pushing the spring arm 222 aside to free the mirror M.

Figure 3:
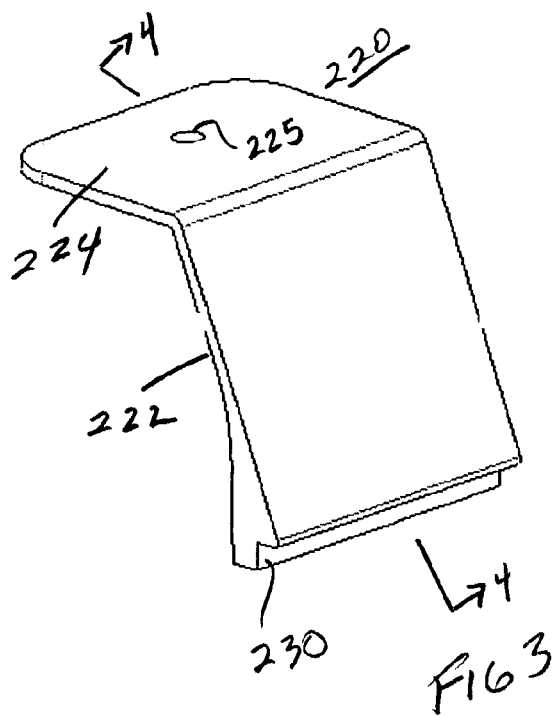
FIG. 3 is an isometric view of a first embodiment of the present invention comprising a spring mounting mirror clip.
Figure 4:
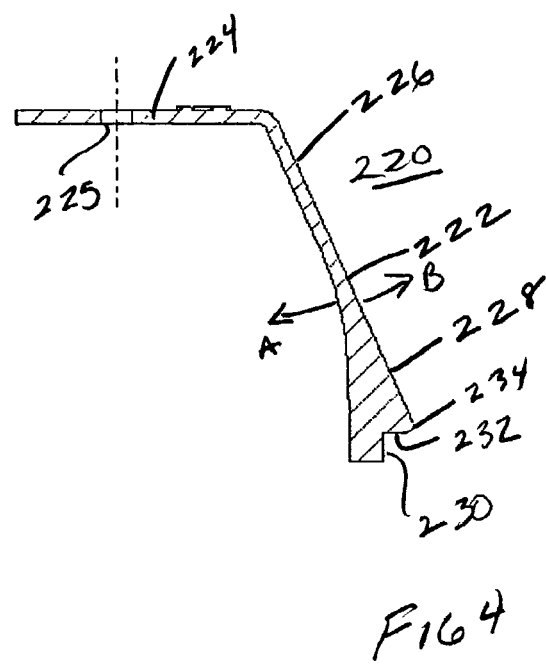
FIG. 4 is a cross-sectional view of the spring mounting mirror clip shown in FIG. 3 and taken along line 4—4 of FIG. 3.

Turning to FIGS. 3 and 4, a first embodiment of the present invention comprising a spring mounting mirror clip 220 is shown. The spring mounting clip 220 preferably comprises a spring arm 222 coupled to a mounting base 224. Preferably, the mounting base 224 and spring arm 222 of the clip 220 are of unitary construction such as an injection molded part formed from pliable plastic. As depicted, the spring arm 222 preferably extends away from the mounting base at an angle $\phi$ from perpendicular preferably in a range of about 5 to 15 degrees. The spring arm 222 preferably comprises a relatively thin upper portion 226, which enables the arm 222 to bend aside as the mirror M is pressed against the back wall 207 and spring back to its original unstressed position. The arm 222 also includes a lower portion 228 that is preferably thicker than the upper portion 226. The lower portion 228 preferably includes a notch 230 formed therein. As depicted, the notch 230 includes a locking surface 232 that, as shown in FIG. 5, abuts and constrains the mirror M.

Referring to FIG. 5, a mounting recess 212 is preferably formed in the enclosure 205 to mount the clip 220 in the enclosure 205. The recess 212 includes a ledge 214 upon which the base 224 of the clip 220 mounts. As depicted, the spring arm 222 extends away from the ledge 214 towards the back wall 207 adjacent the side wall 206. Preferably, the clip 220 is anchored in position by a screw or other fastener extending through hole 225 of the base 224 and into the enclosure 205.

In operation, as the mirror M is pressed against the back wall 207, the mirror M slides along the spring arm 222 and tends to force the spring arm 222 aside as the mirror M approaches the back wall 207 of the enclosure 205. The pressure applied by the mirror M causes the lower portion 228 of the arm 222 to move in the "A" direction, as depicted in FIG. 4, as the arm 222 bends in the upper portion 226. Once the mirror M passes the lip 234 and is received in the notch 230, the arm 222 is free to spring back in the "B" direction, as depicted in FIG. 4, to its original or unstressed position, with the locking surface 232 abutting and constraining the mirror M against the back wall 207. (see FIG. 5)

Turning to FIGS. 6–8, a second embodiment of the present invention comprising a spring mounting clamp 320 is shown. The spring mounting clamp 320 includes a spring lever arm 322 coupled to and extending between a pair of support legs 324, which extend up generally at right angles from mounting feet or bases 326. The support legs 324 are preferably connected to one another via a cross-bar 328 extending there between and located adjacent the mounting feet 326. The spring arm 322 preferably extends away from a longitudinal axis $A_L$ of the support legs 324 at an angle $\phi$ preferably in a range of about 5 to 10 degrees. The spring arm 322 includes upper and lower portions 330 and 332, respectively. The lower portion 332 includes an locking member 334 formed therein, which, as illustrated, is preferably generally L-shaped.

As with the first embodiment, the spring mounting clamp 320 is preferably of unitary construction such as an injection molded part formed from pliable plastic. The arm 322 moves inwardly toward the support legs 324 as a mirror or other object presses against the arm 322 and moves outwardly or freely springs away from the support legs 324 once the mirror or object passes the transition region 336 of the lower portion 332 of the arm 322 and is received by the locking member 334.

As depicted, the spring mounting clamp 320 is preferably mountable on the back wall 207 of the projection television set enclosure 205 to constrain the mirror M in place within the enclosure 205. However, because it is mountable on the back wall 207 of the enclosure 205, the spring mounting clamp 320 may also be mountable on any wall to constrain a wall hanging, such as a mirror, picture, bulletin board, dry erase board and the like, in place on the wall. The clamp 320 is preferably anchored in position on the back wall 207 of the enclosure 205 or some other wall with screws or other fasteners extending through the holes 325 in the feet 326 and into the wall or back wall 207 of the enclosure 205.

Figure 9A:
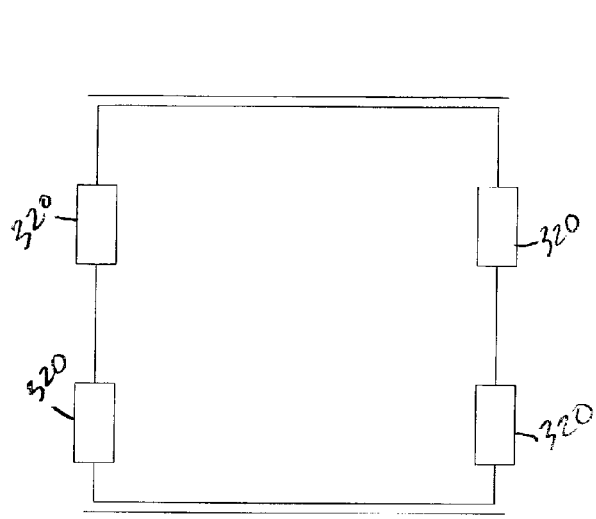
FIGS. 9A–9D are plan views of alternative mounting configurations in accordance with the present invention.
Figure 9B:
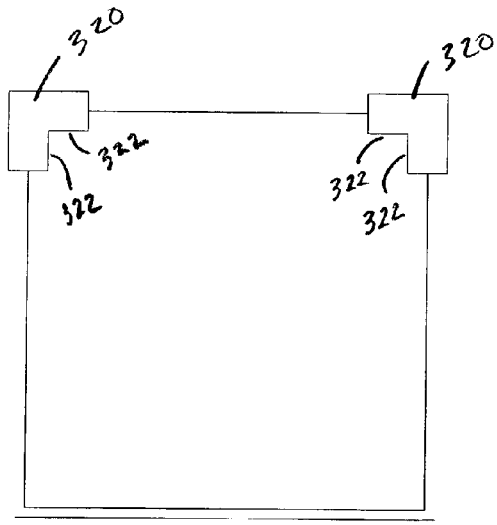
Figure 9C:
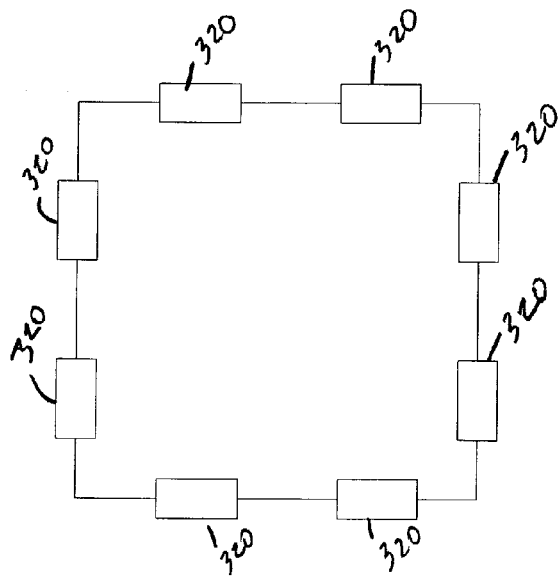
Figure 9D:
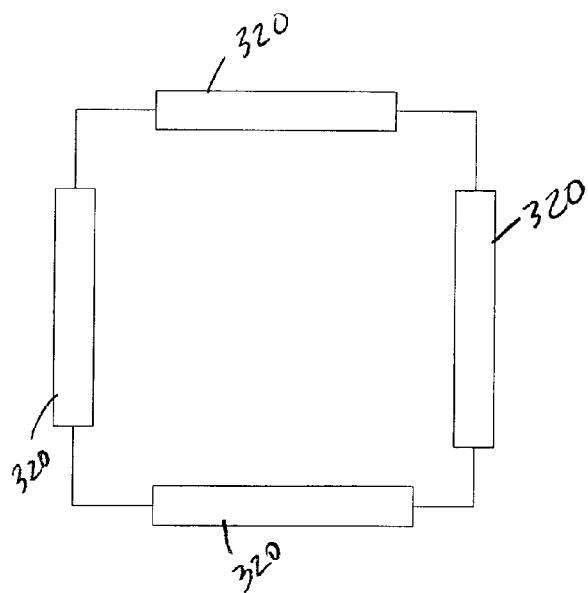

Referring to FIGS. 9A–D, the spring mounting clamp 320 may be utilized in a variety of configurations to constrain a PTV mirror or wall mounting. For example, as FIG. 9A depicts, the mirror M may be constrained on the top and bottom by walls of an enclosure and on the sides by multiple clamps 320. Alternatively, as depicted in FIG. 9B, the mirror M may be constrained on the bottom by the wall of an enclosure and on the top and sides by clamps 320 adapted to engage the corners of the mirror M. The corner adapted clamps 320 may preferably comprise first and second spring arms 322 orthogonally positioned relative to one another. Lastly, the mirror or wall mounting may be constrained on all sides with multiple clamps per side (see FIG. 9C) or an elongated clamp per side (see FIG. 9D).

The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A projection television set comprising:
   an enclosure,
   a mirror, and
   a plurality of spring mounting clips coupled to the enclosure and releasably constraining the mirror within the enclosure, each of the plurality of spring mounting clips including
   a base mounted to the enclosure, and
   a spring arm integrally formed with the base and extending from the base at a first end of the arm in a mirror mounting direction to a second end of the arm having a constraining notch adapted to abut a surface and an edge of the mirror, the arm being movable in a first direction away from the mirror as the mirror is moved along the arm in the mirror mounting direction until the mirror reaches the notch at the second end of the arm, wherein the arm is moveable due to a spring force in a second direction opposite the first direction until the notch engages the edge of the mirror and abuts the surface of the mirror to prevent movement of the mirror in a direction opposite to the mounting direction.

2. The projection television set of claim 1 wherein the first end is thinner than the second end.

3. The projection television set of claim 1 wherein the notch is L-shaped.

4. The projection television set of claim 1 wherein the notch includes a locking surface engaging the mirror.

5. The projection television set of claim 1 wherein the base of each of the plurality of clips comprises first and second support legs, wherein the spring arm extend between and is coupled to the first and second support legs.

6. The projection television set of claim 5 wherein the notch is L-shaped.

7. The projection television set of claim 6 wherein the L-shaped notch includes a locking surface engaging the mirror.

* * * * *